United States Patent
Kotowski et al.

(10) Patent No.: US 10,439,554 B2
(45) Date of Patent: Oct. 8, 2019

(54) METHOD AND APPARATUS FOR SOLAR PANEL PROTECTION AND CONTROL SYSTEM

(71) Applicants: Jeff Kotowski, Nevada City, CA (US); Ron Gangemi, Auburn, CA (US)

(72) Inventors: Jeff Kotowski, Nevada City, CA (US); Charles Cai, Mather, CA (US); Ron Gangemi, Auburn, CA (US)

( * ) Notice: Subject to any disclaimer, the term of this patent is extended or adjusted under 35 U.S.C. 154(b) by 73 days.

(21) Appl. No.: 15/616,927

(22) Filed: Jun. 8, 2017

(65) Prior Publication Data

US 2018/0358924 A1    Dec. 13, 2018

(51) Int. Cl.
| | | |
|---|---|---|
| *H02S 50/10* | (2014.01) | |
| *H02J 3/38* | (2006.01) | |
| *H02S 40/34* | (2014.01) | |
| *H02S 50/00* | (2014.01) | |
| *H02S 40/30* | (2014.01) | |

(52) U.S. Cl.
CPC .............. *H02S 50/10* (2014.12); *H02J 3/385* (2013.01); *H02S 40/30* (2014.12); *H02S 40/34* (2014.12); *H02S 50/00* (2013.01)

(58) Field of Classification Search
CPC ........ H02J 1/10; H02J 1/00; H02J 3/00; H02J 7/35; H02S 40/34; H02S 40/30; H02S 40/32; H02S 40/36; H02S 40/40; H02S 40/20; H02S 40/10
USPC ......................................... 307/80, 82, 83, 43
See application file for complete search history.

(56) References Cited

U.S. PATENT DOCUMENTS

| | | | |
|---|---|---|---|
| 4,175,249 A | 11/1979 | Gruber | |
| 4,328,456 A | 5/1982 | Suzuki | |
| 4,513,167 A | 4/1985 | Brandstetter | |
| 6,060,790 A | 5/2000 | Craig | |
| 6,262,558 B1 | 7/2001 | Weinberg | |
| 6,350,944 B1 | 2/2002 | Sherif | |
| 6,583,522 B1 | 6/2003 | McNulty | |
| 6,635,817 B2 | 10/2003 | Chang | |
| 8,004,117 B2 * | 8/2011 | Adest | H02J 1/12 307/80 |
| 8,344,240 B2 | 1/2013 | Bennett | |
| 8,476,523 B2 | 7/2013 | Bennett | |
| 8,853,605 B2 | 10/2014 | Pan | |
| 8,965,596 B2 | 2/2015 | Li | |
| 9,252,680 B2 | 2/2016 | Huang | |
| 9,336,677 B2 | 5/2016 | Rakib | |
| 9,522,282 B2 * | 12/2016 | Chow | A61N 1/3605 |
| 9,531,297 B2 | 12/2016 | Davies | |
| 9,853,490 B2 * | 12/2017 | Adest | H02J 1/102 |
| 10,097,007 B2 * | 10/2018 | Adest | H02M 3/1582 |
| 10,128,683 B2 * | 11/2018 | Avrutsky | H01L 31/02021 |
| 2009/0025778 A1 | 1/2009 | Rubin | |
| 2009/0066357 A1 | 3/2009 | Martin | |
| 2009/0140719 A1 | 6/2009 | Gary | |
| 2016/0118934 A1 * | 4/2016 | Johnson | H02S 40/34 136/244 |

(Continued)

*Primary Examiner* — Fritz M Fleming
*Assistant Examiner* — Jagdeep S Dhillon
(74) *Attorney, Agent, or Firm* — Inventive Law Inc.; Jim H. Salter

(57) ABSTRACT

Embodiments disclosed herein describe a solar panel protection and control system. The system can bypass the solar panel under hazardous conditions or under command. The system can also help a solar panel array to reach its maximum power point in operation.

21 Claims, 8 Drawing Sheets

(56) References Cited

U.S. PATENT DOCUMENTS

2016/0164457 A1* 6/2016 Robbins ................. H02S 40/34
                                                    307/80
2016/0226439 A1* 8/2016 Gibson ................ H01L 31/044
2017/0170782 A1* 6/2017 Yoscovich ........... H02H 1/0015
2017/0357278 A1* 12/2017 Bernardon ............. G05F 1/575
2018/0097398 A1* 4/2018 Riedl ....................... H02J 4/00

* cited by examiner

METHOD AND APPARATUS FOR SOLAR PANEL PROTECTION AND CONTROL SYSTEM

CROSS REFERENCE TO RELATED APPLICATIONS

Not applicable.

FIELD OF INVENTION

This invention relates to a system to protect the solar panel by disconnecting it under hazardous conditions. This system can also monitor the solar panel parameters and help find the maximum power point.

BACKGROUND OF INVENTION

Using solar energy to replace fossil energy is becoming increasingly important and is gaining popularity to save the environment of earth and to have a sustainable energy resource for human kind. Usually many solar cells (which are the semiconductor devices that generate electric current under light) are connected in series to form a solar panel, and many solar panels are connected in series to form a solar panel array. An inverter (also called "central inverter") is usually connected to the solar panel array to convert the power from the solar panel array to a desired voltage or current. The key to facilitate the solar energy usage adaptation is to make solar energy high efficiency and low cost. The low cost refers to not only the low cost of solar cell itself, but also the low cost of solar panel array installation, testing, monitoring and debugging.

Since a solar panel array can have a high voltage of several hundred volts, the safety is a big concern during solar panel installation and maintenance. For example, in order to provide the firefighters' a safe access to the roof with solar panel installation, the State of California passed a new law, effective from Jan. 1, 2014, which mandates at least 3-feet setback from the roof ridge line for solar panel installation in all California cities and counties. This new setback guidelines make the ideal solar roof space unavailable for solar panel installation, and will increase the overall cost of solar power system. Another serious safety concern about the solar panel is the arc fault. Arc faults are caused by air gaps between electrical conductors associated with the solar panel system. The most common causes are faulty manufacturing, installer error, or aging, degraded connectors. When an arc fault happens, the electrical current across the loose connection produces sparks which could cause a fire. The 2011 National Electrical Code (NEC) requires the rooftop solar arrays to equip an arc fault current interrupter (AFCI). The AFCI currently available on market are not only expensive, but also prone to nuisance-tripping in response to other electrical activities that are not in fact arc faults.

The high efficiency of solar power system depends on not only the high energy conversion efficiency of solar cell itself, but also how effectively the available solar cell power can be extracted out and converted into useful form of energy. Solar cell has its unique voltage-current curve which results in a Maximum Power Point (MPP) where the solar cell can output maximum power. In practice the solar cells are usually connected in series to form a solar panel, and many solar panels are connected in series to form a solar panel array. Serial connection overall brings lower installation cost and higher inverter's efficiency, but it also has a serious problem: the current of a string of solar cells is limited by the weakest cell in the string. So if one solar cell in a string is shaded or severely degraded, it will drag down the output power of the whole string dramatically. In this situation, the rest of the cells in the string will generate high reverse bias voltage across the shaded cell and will break it down and cause irrecoverable damage (this is usually called "hot spot" problem). To address this issue, people usually add a bypass diode to every solar panel, to bypass the underperforming solar panel. If a small number of solar panels in a big solar panel array are shaded, the total output power of the solar panel array may have multiple local maximum points instead of one. The central inverter can be stuck in a local maximum power point and fail to find the global and best maximum power point. This will result in much lower efficiency of solar panel array since its best maximum power is not extracted out by the central inverter. A solar panel array with multiple local maximum power points brings the central inverter a fundamental problem: if the inverter's Maximum Power Point Tracking (MPPT) algorithm searches narrowly on power-voltage curve of the solar panel array, chances are that it will be stuck in a local maximum power point; but if the inverter's MPPT algorithm searches widely, the inverter will deviate far from the best maximal power point. In other words, the normal operation of the solar panel array will be interrupted during the search.

To solve or alleviate above problems, some companies proposed to divide the solar panel array into multiple sub-arrays or panels and use a micro-inverter for each panel. Each micro-inverter converts the power from the panel it connects to and then sums the power from all micro-inverters together. This approach needs many expensive micro-inverters and more complicated routing, so its cost is prohibitively high.

A solution to the above problems is highly desired, to increase the safety of solar panel array, increase the overall efficiency of solar power system, and to lower the solar panel installation cost.

SUMMARY

The methods and apparatuses disclosed by this invention describes a system to increase the safety of the solar panel array in installation and maintenance. The system can disconnect one or more solar panels in case of hazardous conditions such as fire or arc fault, to protect the personnel and the solar panels. This system can also monitor the solar panel parameters and help find the maximum power point, so to increase the overall efficiency of the solar power system. The system is of low cost, and has small form factor and can be placed inside the J-box (also called "Junction Box") of a solar panel.

BRIEF DESCRIPTION OF THE DRAWINGS

Embodiments of the invention relating to both structures and methods of operation may best be understood by referring to the following descriptions and accompanying drawings.

DETAILED DESCRIPTION

Figure 1:
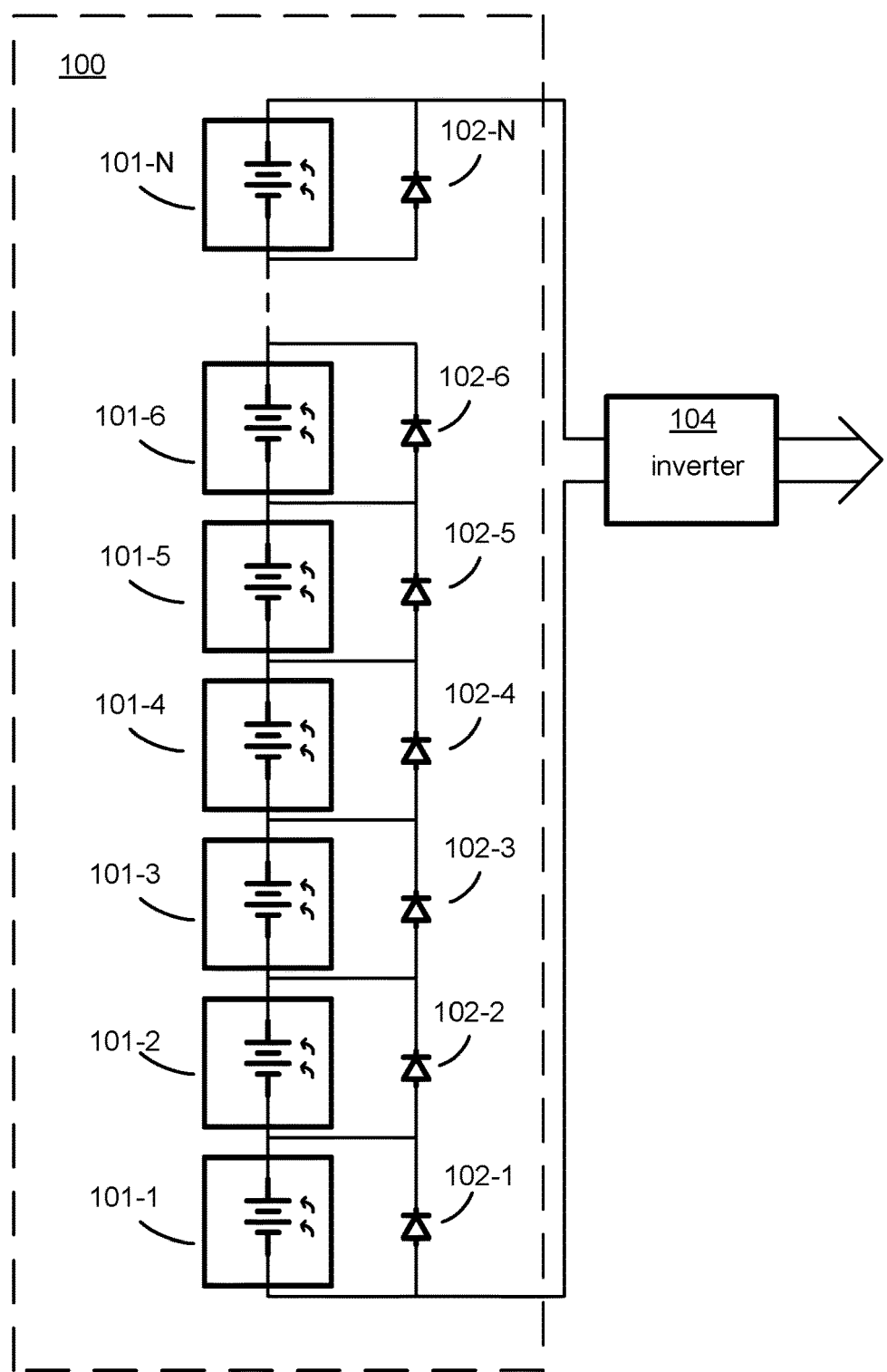
FIG. 1 shows a prior art of solar panel system.

Solar power provides a clean and renewable energy resource to replace the fossil energy. FIG. 1 shows a conventional solar power system people are using today. In FIG. 1, a solar panel 101 contains one or more solar cells in series. N of the solar panel 101 connect in series to form a solar panel array 100 which is connected to an inverter (also called "central inverter") 104. Solar panel 101-N refers to the Nth solar panel 101. The central inverter 104 usually employs MPPT (Maximum Power Point Tracking) technology, which is eventually a way of impedance matching, to extract the power from the solar panel array 100 and turn it into a DC (Direct Current) or AC (Alternating Current) output. The output of the central inverter 104 can be used to charge a capacitor, to drive an electric load, or to feed into the power grid to earn credit or cash. Because of the well-known "hot-spot" problem, a bypass diode 102 is usually needed. For simplicity of illustration, we show in FIG. 1 that there is a bypass diode 102 connected to each of the solar panel 101. In reality, the bypass diode 102 is usually placed inside a Junction-Box of the solar panel 101. Since the solar panel array 100 can have a voltage as high as several hundred volts, there is a big safety concern during its installation and maintenance. Additional safety measures are mandated to protect the firefighters in case of fire and workers in the process of installation and maintenance. This increases the overall cost of the solar power system. Also in practical operation, it is very difficult, if not impossible, to avoid the partial shading problem for the solar panel array 100, which can result from bird dropping, fallen leaves, trees or constructions in proximity. When the solar panel array 100 is partially shaded, it can have one global maximum power point and many local maximum power points. Since there is more than one maximum power point, chances are that the central inverter 104 will settle at a local maximum power point instead of the global maximum power point. The result is that the solar power system is working at a lower power efficiency and much of the available power of the solar panel array 100 is wasted.

The methods and apparatuses disclosed by this invention describes a solar panel protection and control system to increase the safety of the solar panel array in installation and maintenance. The system can bypass one or more solar panels in case of hazardous conditions, to protect the personnel and the solar panels. This system can also monitor the solar panel parameters and help find the maximum power point, to increase the overall efficiency of the solar power system.

In following paragraphs embodiments of this invention will be shown for example to explain the concept of the invention in detail. However it should be understood that it is not intended to limit the invention to the particular apparatuses and methods disclosed, but on the contrary, the intention is to cover all the apparatus and method modifications, equivalents and alternatives falling within the scope of the invention defined by the appended claims.

Figure 2:
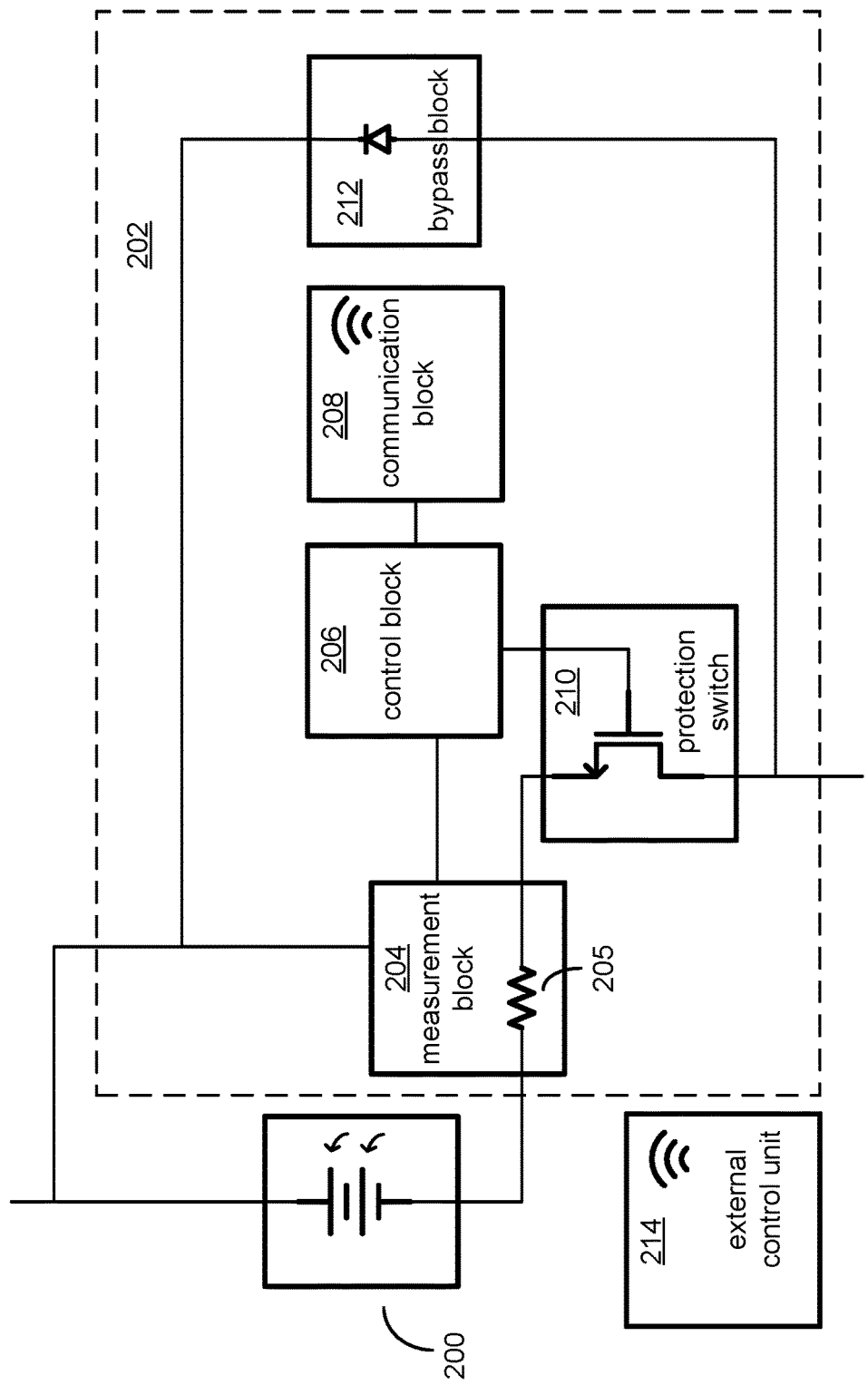
FIG. 2 shows an embodiment of this invention.

FIG. 2 shows an embodiment of a solar panel protection and control system of this invention. In FIG. 2, a solar panel protection and control system 202 is coupled together with a solar panel 200. The solar panel 200 includes a measurement block 204, a control block 206, a communication block 208, a protection switch 210 and a bypass block 212. The measurement block 204 is coupled together with the solar panel 200, and the measurement block 204 can measure the voltage of the solar panel 200. The measurement block 204 has also a sensing resistor 205 which is coupled in series with the solar panel 200. By measuring the voltage across the sensing resistor 205, the measurement block 204 can also measure the current of the solar panel 200. The protection switch 210 is coupled to the sensing resistor 205 in series. The control block 206 is coupled to the protection switch 210. The protection switch 210 can be a relay, a NMOS (n-channel MOSFET), a PMOS (p-channel MOSFET), a PNP BJT (Bipolar Junction Transistor), a NPN BJT, a IGBT (Insulated Gate Bipolar Transistor) or a SCR (Silicon Controlled Rectifier), or any combination of thereof. The control block 206 can control the protection switch 210 to turn on or off. During normal operation, the control block 206 controls the protection switch 210 to be turned on so the current generated by the solar panel 200 can flow through the path of the sensing resistor 205 and the protection switch 210. In case of fire, over temperature, shading, damage, installation or maintenance, the control block 206 can control the protection switch 210 to turn off. The bypass block 212 is usually a Schottky diode and is coupled to the solar panel 200. When the protection switch 210 is turned off, the current generated by other solar panels can bypass the solar panel 200 and flow through the bypass block 212. The control block 206 is coupled to the measurement block 204 and the communication block 208. The measurement block 204 can measure the parameters such as the voltage, current and temperature of the solar panel 200 and send them to the communication block 208. The communication block 208 is coupled to an external control unit 214 through wireless communication. The communication block 208 can send out the parameters measured by the measurement block 204 wirelessly to the external control unit 214. The control block 206 can control the protection switch 210 to turn off when one or more parameters (for example, temperature) measured by the control block 206 reaches a predetermined value, in order to protect the solar panel 200. The external control unit 214 can also send a command wirelessly to the control block 206 through the communication block 208 to turn on or off the protection switch 210. Since the protection switch 210 is coupled in series with the solar panel 200. Even when the protection switch 210 is turned off and the solar panel 200 is bypassed by the bypass block 212, the solar panel 200 still has voltage across its both ends and can still provide power for the measurement block 204, the control block 206, the communication block 208 and the protection switch 210. In the embodiment shown in FIG. 2, people can use the external control unit 214 (for example, a smart phone) to communicate with the solar panel protection and control system 202 wirelessly, to monitor the parameters of the solar panel 200, and to bypass or not the solar panel 200 as needed.

Figure 3:
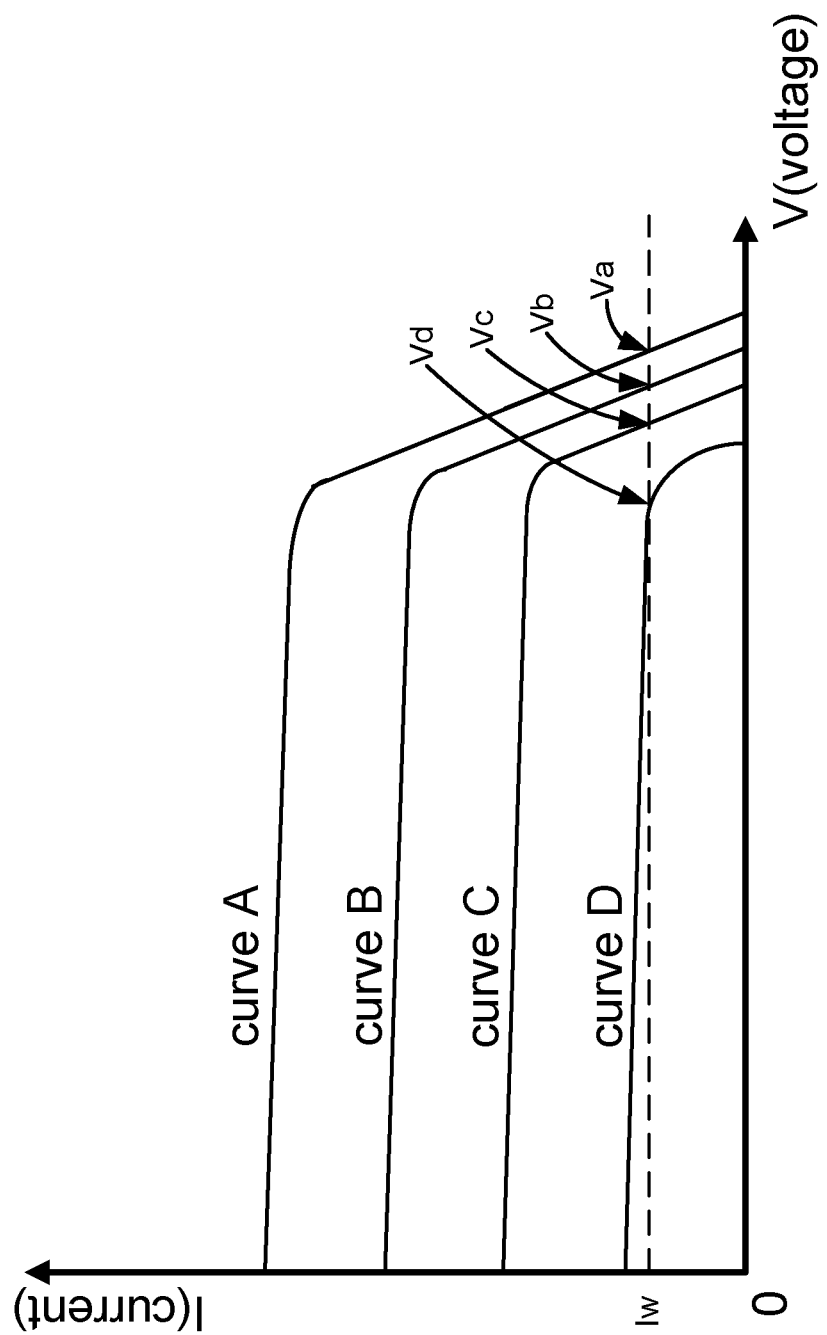
FIG. 3 shows the voltage-current curve of solar cell under different conditions.

When multiple solar panels connect in series to form a solar panel array, its performance is limited by the weakest panel. FIG. 3 shows the voltage-current curves for different solar panels under different conditions. In FIG. 3, the curve A, curve B, curve C and curve D represent the voltage-current curves of solar panel A, solar panel B, solar panel C and D respectively. For illustration purpose, we assume that the solar panels A, B, C and D are similar solar panels working under different shading conditions, where the solar panel D has the most sever shading and the solar panel A has the least shading. When the solar panels A, B, C and D are connected in series to form a solar panel array, its performance is limited by the solar panel D. The solar panel A, B, C and D all have the same current Iw which is limited by the solar panel D. At this time, the voltages of the solar panel A, B, C and D will be different: Va>Vb>Vc>Vd. The weaker the solar panel is, the smaller its voltage will be. So by measuring the voltage of the solar panels, we can know which solar panel is the weakest and is limiting the performance of the whole solar panel array. So potentially we can turn off and bypass the weakest solar panel using the solar panel protection and control system 202 shown in FIG. 2, to set the whole solar panel array at a better voltage-current point to output more power. The criterion to determine if a weak solar panel should be bypassed depends on many factors such as the numbers of solar panels connected in series, the matching of the performances of the solar panels, the sunshine condition, etc. Generally speaking, for a solar panel array which has 10 or more solar panels connected in series, if the voltage of a solar panel, compared to the voltages of other solar panels, is more than 15% less, this weak and underperforming solar panel should be bypassed to help the whole solar panel array reach a better maximum power point.

Figure 4:
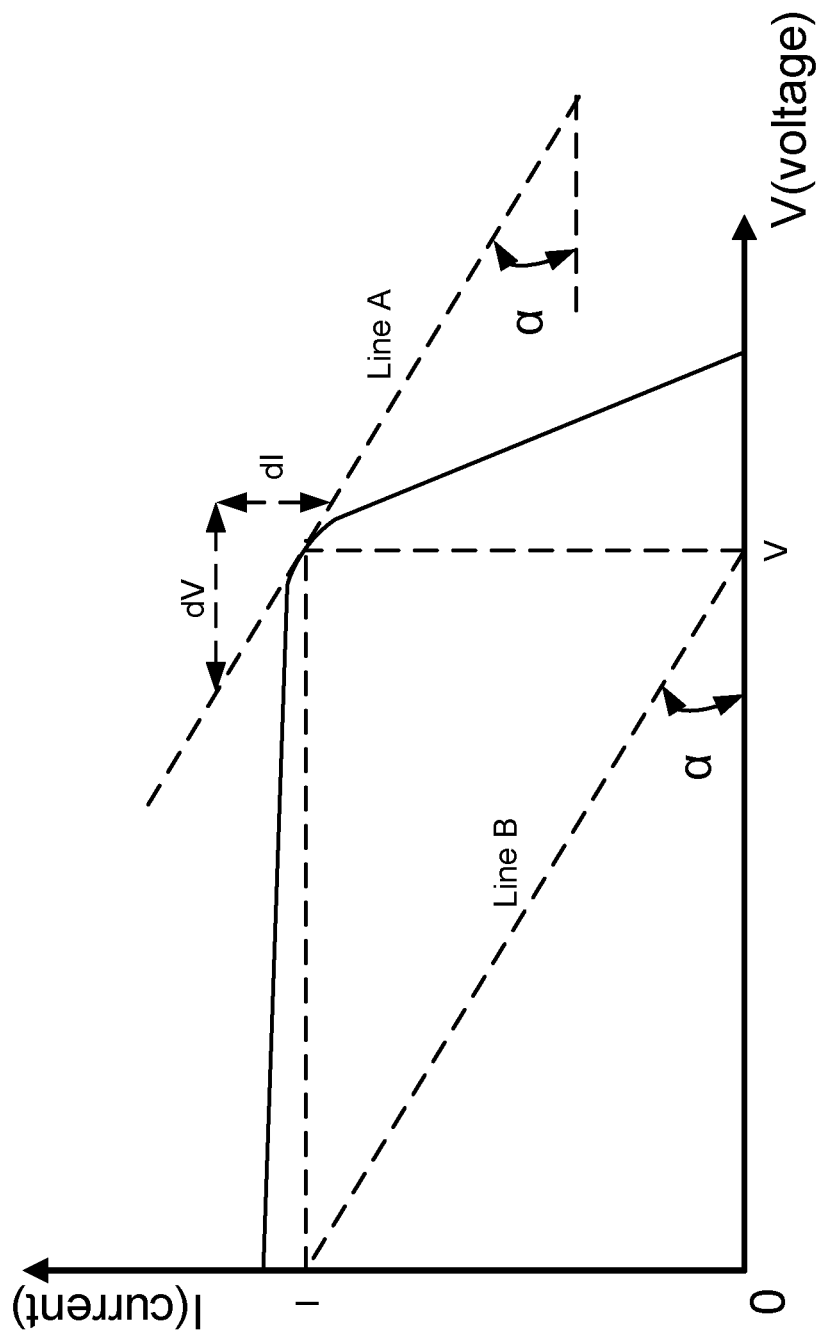
FIG. 4 shows the condition for a solar cell to reach its maximum power point.

In FIG. 4 we disclose a method to find the maximum power point of a solar cell, which we call "Maximum Power Law". As shown in FIG. 4, the voltage-current curve of a solar cell has a particular point where the solar cell reaches its maximum power point and outputs maximum power.

Power $P=V^*I$ $dP=dV^*I+V^*dI$ gradient of curve $k=dI/dV$ $dP=dV^*I+V^*k^*dV=(I+V^*k)^*dV$ at the maximum power point: $0=dP \rightarrow k=-I/V$ From above mathematical equations, we can see that at the maximum power point the gradient of the voltage-current curve k (=dI/dV) should equal the negative ratio of the solar panel's current to its voltage. In other words, the line A and line B as shown in FIG. 4 should be in parallel at the maximum power point. This discovery leads to a "Maximum Power Law" we disclose here: A solar cell will reach its maximum power point when the gradient of its voltage-current curve equals the negative ratio of its current to voltage. Usually for a solar panel containing multiple solar cells connected in series, the Maximum Power Law is also valid since the solar panel has a voltage-current curve which is similar to the one of a solar cell. So the Maximum Power Law can also be stated for solar panel as: A solar panel will reach its maximum power point when the gradient of its voltage-current curve equals the negative ratio of its current to voltage. By applying the Maximum Power Law, we can measure the gradient of a solar panel's voltage-current curve and compare it to the negative ratio of its current to voltage, to find the solar panel's maximum power point or to see if the solar panel has reached the maximum power point or not. This method disclosed here has many advantages. For example, this method can measure the maximum power point of a solar panel. After knowing the maximum power point of every solar panel in a solar panel array, we can easily find the best maximum power point of the whole solar panel array, by figuring out all possible configurations of the solar panel array and calculating its corresponding total output power, and configure the solar panel array in that way by bypassing one or more underperforming solar panels as needed. The central inverter can work at the maximum power point right away without delay or sweeping through a big voltage range to find the best maximum power point. Even for a very complicated solar panel array configuration where many solar panels can connected in series or parallel or in any combination of them, the best (global) maximum power point of the solar panel array can be found and the central inverter will not be stuck to any of the many local maximum power points in case of partial shading. Another advantage is: this method measures the gradient of a solar panel's voltage-current curve and it does not disturb the normal operation of the solar panel during the measurement. In another words, the output power of a solar panel array will not be decreased when we measure the maximum power point of each solar panel. Since the measuring process of each solar panel's maximum power point does not disturb the operation of the solar panel array, this measurement can be done constantly in real time in the background. This can guarantee the whole solar panel array to work at its best maximum power point all the time.

Figure 5:
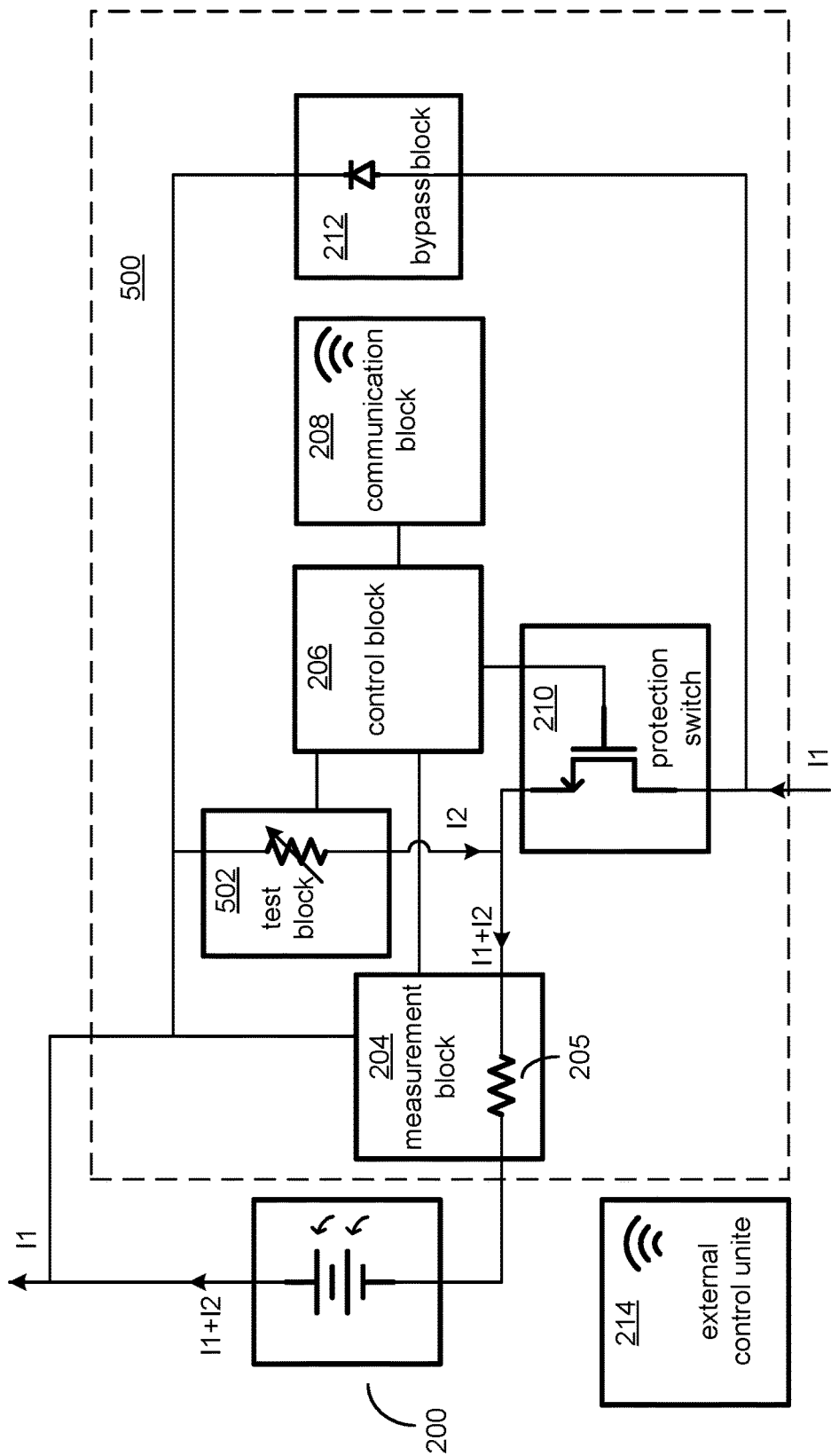
FIG. 5 shows another embodiment of this invention with a test block.

FIG. 5 shows another embodiment of a solar panel protection and control system of this invention with a test block to measure the gradient of the voltage-current curve of the solar panel. In FIG. 5, a solar panel 200 is coupled to a solar panel protection and control system 500. The solar panel protection and control system 500 is similar to the solar panel protection and control system 202 shown In FIG. 2. The solar panel protection and control system 500 also includes a test block 502. In FIG. 5, the solar panel 200 is coupled to the sensing resistor 205 in series, and then the test block 502 is coupled to them in parallel. The test block 502 can be a voltage-controlled resistor or a resistor switch array which can change its resistance. The test block 502 is coupled to the control block 206, and the control block 206 can control the test block 502 to change its resistance. The purpose of having the test block 502 is to measure the gradient of the voltage-current curve of the solar panel 200. The control block 206 controls the test block 502 to decrease its resistance from an initial high resistance value, and there will be an additional current I1 drawn from the solar panel 200 and flowing through the test block 502. Now the total current drawn from the solar panel 200 will be I=I1+I2 and the solar panel 200 will be operating at a different voltage-current bias point with lower voltage V. The variance of the current I divided by the variance of the voltage of the solar panel 200 is the gradient of the voltage-current curve of the solar panel 200 at this bias point. We can compare the measured gradient to the negative ratio of the current I of the solar panel 200 to its voltage V. If the measured gradient equals to the negative ratio I/V, the solar panel 200 is operating at its maximum power point with the present V and I. If the measured gradient equals is less than the negative ratio I/V, (since the gradient is a negative number, the absolute value of the gradient is actually bigger than the absolute value of the ratio I/V) the control block 206 will control the test block 502 to continue to decrease its resistance and measure the gradient at a lower voltage V point of the solar panel 200. This process will be repeated until the measured gradient equals the negative ratio I/V where the maximum power point of the solar panel 200 is found. Please be noted that during these measurements, although the current (I2) flowing through the test block 502 can change, the current I1 which flows into other solar panels keeps the same. The voltage across the solar panel 200 can be slightly smaller, but the voltage variance is negligible and does not impact the voltage of the whole solar panel array.

In other words, these measurements do not disturb the normal operation of the whole solar panel array. To get accurate measurement of the gradient of the voltage-current curve of the solar panel 200, the control block 206 can control the test block 502 to decrease its resistance at a predetermined fine step. For example, the control block 206 can control the test block 502 to decrease its resistance in each measurement until the voltage V of the solar panel 200 decreases by a predetermined value (for example 5% of the voltage V of the solar panel 200 when the resistance of the test block 502 is infinity). When the resistance of the test block 502 is very low, the current I2 flowing through the test block 502 can be big and consequently the power consumption of the test block 502 can be big and it needs to be able to dissipate a lot of heat. There are many ways to solve this potential issue. One way is to decrease the duty cycle of the measurement, which means to conduct the measurement quickly (for example, for 10~50 milliseconds) at a long time interval (for example, every 1~60 seconds). This can decrease the average power consumption of the test block 502. When the solar panel 200 is partially shaded and underperforming, the control block 206 can control the protection switch 210 to turn off. The solar panel 200 is bypassed and the current I1 will flow through the bypass block 212. At this time, the measurement of the gradient of the voltage-current curve of the solar panel 200 can still be conducted to find its maximum power point. If the shading of the solar panel 200 is removed later and the solar panel 200 can reach a higher maximum power point, the protection switch 210 can be turned on and the solar panel 200 can be switched back to join the solar panel array. By constantly measuring the maximum power point of each solar panel, the whole solar panel array can be monitored constantly in real time, and always be guaranteed to work at its best maximum power point.

Figure 6:
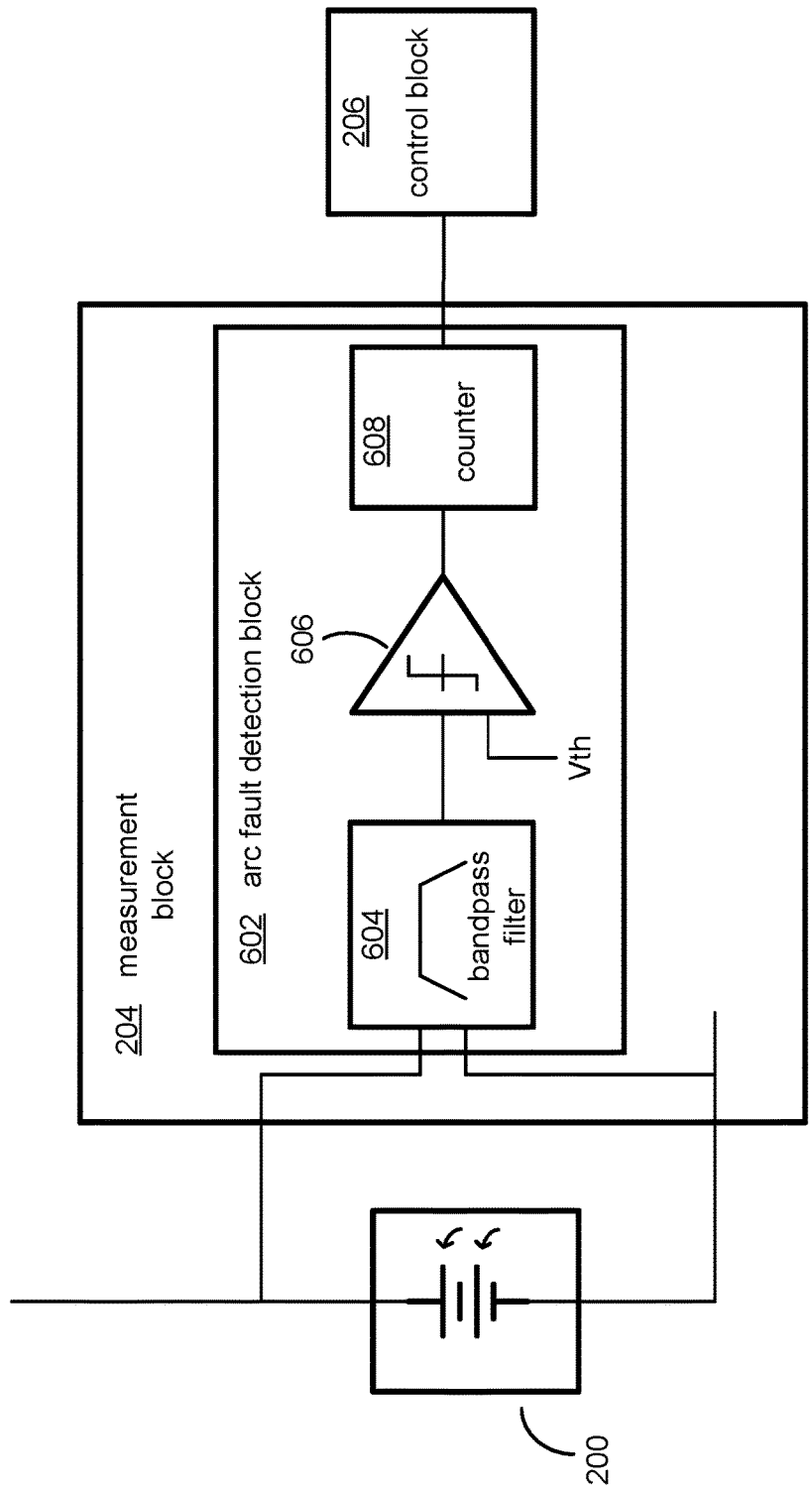
FIG. 6 shows an embodiment of this invention with arc fault detection block.

Since the methods and apparatuses disclosed in this invention can measure the parameters of each solar panel directly, they also make the arc fault detection easily feasible at low cost. Also because the methods and apparatuses for arc fault detection disclosed in this invention do not depend on a high frequency signal traveling in the air as many prior arts did, they are much more reliable and immune to nuisance tripping. The measurement block 204 described in previous embodiments can include an arc fault detection feature. FIG. 6 shows an embodiment of a solar panel protection and control system of this invention which includes an arc fault detection block. In FIG. 6, a measurement block 204 is coupled to a solar panel 200 and a control block 206 as shown in previous figures. The measurement block 204 includes an arc fault detection block 602. The arc fault detection block 602 includes a bandpass filter 604, a comparator 606 and a counter 608. The bandpass filter 604 is coupled to the solar panel 200 to measure its voltage. When an arc fault event occurs, the voltage across the solar panel 200 will oscillate at certain frequency which can be from about 50 hertz to 100,000 hertz or even higher. The bandpass filter 604 is a filter with a predetermined passing band frequencies (for example, from 50 hertz to 100,000 hertz) which can filter out the DC signal and high frequency noise. The bandpass filter 604 is coupled to the comparator 606. The comparator 606 will compare the output of the bandpass filter 604 to a threshold voltage Vth, to output a logic high or logic low signal. The comparator 606 is coupled to the counter 608. The counter 608 will count the number of logic high signals from the output of the comparator 606. If a predetermined arc fault signature is found (for example, more than 4, 8, 16 or 32 times of logic high signals shown up within 0.5 or 1 second), the counter 608 will decide that an arc fault event occurs. The counter 608 is coupled to the control block 206 and will alert the control block 206 that an arc fault event occurs. The control block 206 will then take corresponding appropriate actions such as turning off the solar panel 200 and reporting the arc fault event to an external control unit. It is common that the bandpass filter 604 can also have a gain factor so that its output voltage level is comparable to the threshold voltage Vth and the working condition of the comparator 606. The arc fault detection block 602 in the embodiment shown in FIG. 6 can directly measure the voltage of the solar panel 200, and if the voltage shows a predetermined arc fault signature then it can tell that an art fault event occurs. The arc fault detection block 602 does not depend on a high frequency signal traveling in the air as many prior arts did, so it is much more reliable and immune to nuisance tripping. Obviously the actual implementation of the arc fault detection block 602 shown in FIG. 6 is for illustrative purpose only and does not limit the claim scope. The arc fault detection block 602 can have many variations and modifications. For example, the functions of the bandpass filter 604, the comparator 606 and the counter 608 can also be realized in firmware of a microprocessor after the voltage of the solar panel 200 has been sampled by a ADC (Analog to Digital Converter).

Figure 7:
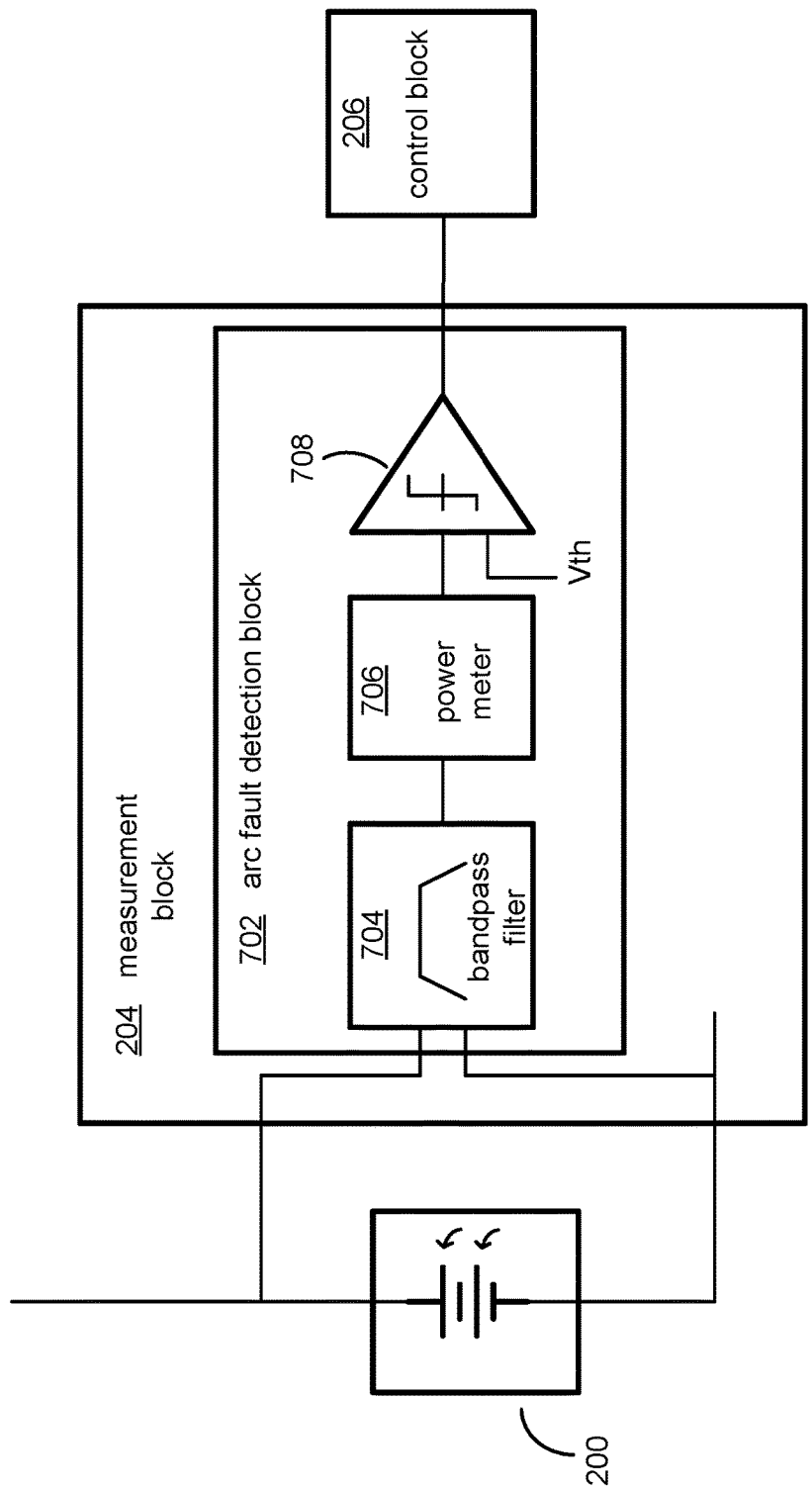
FIG. 7 shows another embodiment of this invention with arc fault detection block.

FIG. 7 shows another method to implement the arc fault detection block. In FIG. 7, an arc fault detection block 702 includes a bandpass filter 704, a power meter 706 and a comparator 708. The bandpass filter 704 processes the voltage measured from a solar panel 200. Only the signal (with frequency from 50 hertz to 100,000 hertz) related to arc fault event can pass through the bandpass filter 704. The bandpass filter 704 is coupled to the power meter 706. The power meter 706 is to measure the power level of the signal passing through the bandpass filter 704. The power meter 706 can be a peak detector and an envelope detector. The power meter 706 is coupled to the comparator 708. If the power level of the signal passing through the bandpass filter 704 is strong and higher than a predetermined threshold voltage Vth, the comparator 708 will output a signal to alert the control block 206 that an arc fault event occurs.

Figure 8:
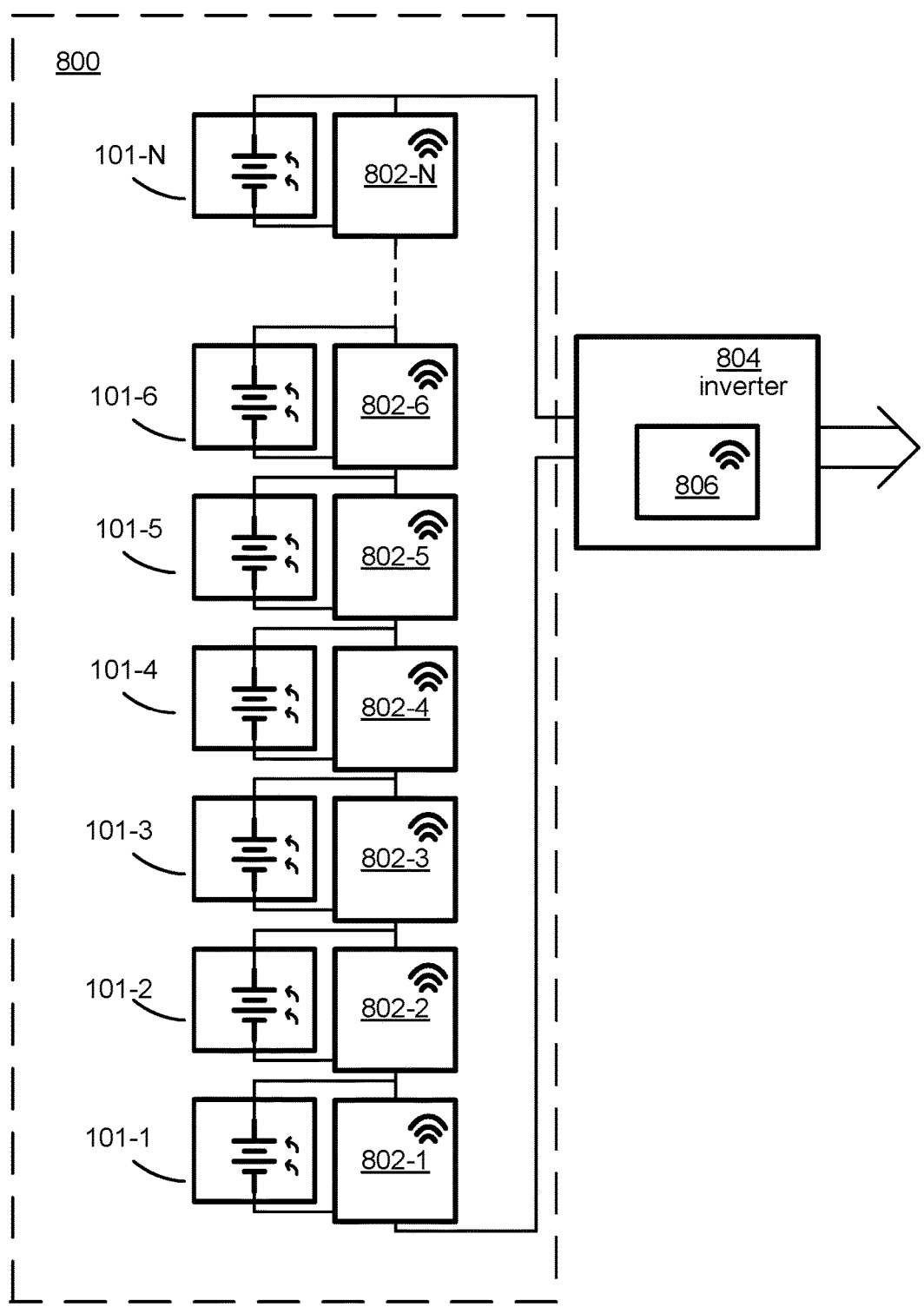
FIG. 8 shows an embodiment of solar panel protection and control system of this invention.

FIG. 8 shows an embodiment of a solar panel protection and control system of this invention. In FIG. 8, a solar panel array 800 contains N of the solar panel 101 and N of the solar panel protection and control system 802. The solar panel 101-N refers to the Nth solar panel 101, and the solar panel protection and control system 802-N refers to the Nth solar panel protection and control system 802. It is obvious that each solar panel protection and control system 802 will have an unique address or ID (Identification) to differentiate itself from other solar panel protection and control system 802. The solar panel 101 is coupled to its corresponding solar panel protection and control system 802, and then coupled to other solar panel 101 and solar panel protection and control system 802 in series. For illustration purpose, the solar panel 101 are coupled in series here, but they can also be coupled in parallel, in series or in any combination of both in practice. A central inverter 804 is coupled to the solar panel array 800, to extract the power from it. The central inverter 804 includes a external control unit 806 which can communicate with the solar panel protection and control system 802. The external control unit 806 can communicate with the solar panel protection and control system 802 via wireless methods such as Wifi, Bluetooth or Zigbee as shown in FIG. 8. The external control unit 806 can also communicate with the solar panel protection and control system 802 via DC power line communication, which leverages the connection line between the solar panel 101. Since each solar panel protection and control system 802 has its own unique address (or ID), the external control unit 806 can communicate with each solar panel protection and control system 802, to get its parameters and send commands to it. The solar panel protection and control system 802 can measure the parameters of its corresponding solar panel 101 including but not limited to current, voltage, temperature, maximum power point, arc fault condition, etc. The solar panel protection and control system 802 can bypass the solar panel 101 it is coupled with, when a predetermined parameter reaches a predetermined value, for example, when the solar panel 101 is overheated and its temperature reaches a certain high value; or when the solar panel 101 has an arc fault event. The solar panel protection and control system 802 can bypass one or more solar panel 101 in predetermined situations including but not limited to fire, overheated, arc fault, etc. In these situations, the solar panel protection and control system 802 can also communicate to the central control unit 806 to notify that its corresponding solar panel 101 has been bypassed and for what reason. This can help monitor the performance of the solar panel array 800 and debug its failure. In some predetermined situations including but not limited to installation, maintenance, repair, etc., the central control unit 806 can send command to one or more solar panel protection and control system 802, to bypass its corresponding solar panel 101. This can help protect the solar panel 101 and improve the safety of the personnel working for or around it, and eventually lower the cost of solar power system. The solar panel protection and control system 802 can send the measured parameters of its corresponding solar panel 101 to the external control unit 806. The external control unit 806 can compare these parameters to decide a better maximum power point of the solar panel array 800. For example, if the voltage of a particular solar panel 101 is less than that of the other solar panel 101 by more than 15%, the external control unit 806 can send command to bypass that particular solar panel 101 to enable the solar panel array 800 to work at a better maximum power point so the central inverter 804 can output more power. In FIG. 8, each solar panel protection and control system 802 can measure the maximum power point of its corresponding solar panel 101 using the "Maximum Power Law" described in previous paragraphs. The external control unit 806 can collect the maximum power point of all the individual solar panel 101. The external control unit 806 then can calculate the output power for every possible configurations and find the best maximum power point of the solar panel array 800. The external control unit 806 can calculate the output power for all different configurations when one or more underperforming solar panel 101 (with less maximum power point compared to other solar panel 101) turned off. The external control unit 806 can find the best configuration of the solar panel array 800 with the biggest output power. The external control unit 806 then can configure the solar panel array 800 according to this best configuration by sending command to one or more solar panel protection and control system 802 to bypass their corresponding underperforming solar panel 101. Thus, the solar panel array 800 will work at its best maximum power point and output biggest power. The solar panel protection and control system 802 can constantly measure the maximum power point of its corresponding solar panel 101, and send the measured parameters to the external control unit 806. The external control unit 806 can constantly monitor the maximum power point of every solar panel 101, and figure out the configuration of the solar panel array 800 which can reach the best maximum power point and configure the solar panel array 800 accordingly. When the maximum power points of one or more solar panel 101 change over time under different conditions, the external control unit 806 can reconfigure the solar panel array 800 to guarantee that the solar panel array 800 works at its best maximum power point all the time. To monitor the maximum power point of every solar panel 101, the external control unit 806 can command each of the test block 502 (as shown in FIG. 5) to measure the maximum power point of its corresponding solar panel 101 at the same time, or in sequence where one test block 502 starts its measurement after another test block 502 finishes its measurement.

In FIG. 8, another embodiment disclosed by this invention includes more safety features to provide additional protection. In this embodiment, the solar panel protection and control system 802 has a default state of bypassing its corresponding solar panel 101. The solar panel protection and control system 802 will bypass its corresponding solar panel 101 when it is powered on for the first time. This means the control block 206 will control the protection switch 210 to bypass the solar panel 200 when it is powered on for the first time, as shown in FIG. 5. In FIG. 8, the solar panel protection and control system 802 only turn on (stop bypassing) its corresponding solar panel 101 after it receives a turning-on command to do so from the external control unit 806. In this embodiment, the external control unit 806 will send out a turning-on command to the solar panel protection and control system 802 to turn on its corresponding solar panel 101. If solar panel protection and control system 802 does not receive the turning-on command from the external control unit 806 for longer than a predetermined period of time (for example, 60 seconds) during operation, it will bypass its corresponding solar panel 101. This means in FIG. 5 the control block 206 will control the protection switch 210 to bypass the solar panel 200 if it does not receives the turning-on command for longer than a predetermined period of time during operation. In FIG. 8, In this embodiment, the solar panel 101 are bypassed by default, which means the solar panel protection and control system 802 will bypass its corresponding solar panel 101 when it is powered on for the first time. The solar panel protection and control system 802 will keep bypassing its corresponding solar panel 101 unless it receives a turning-on command from the external control unit 806. So in the night, all the solar panel 101 are bypassed. In the morning when the central inverter 804 wakes up, the external control unit 806 sends out a turning-on command to turn on the solar panel 101. The external control unit 806 sends out the turning-on command on a periodical basis during operation to keep the solar panel 101 turned on, so the central inverter 804 can convert power from the solar panel array 800. If for any reasons the central inverter 804 stops working (for example, in situation of fire, lack of sunshine, earthquake, etc.), the external control unit 806 will stop sending out the turning-on command so the solar panel 101 will be bypassed. When the solar panel 101 are bypassed, the solar panel array 800 will not generate high voltage. This can provide additional safety protections.

While the present disclosure describes several embodiments, these embodiments are to be understood as illustrative and do not limit the claim scope. The structures and methods disclosed in this invention can have many variations and modifications. Having thus described the present invention it will be apparent to one of ordinary skill in the art that various modifications can be made within the spirit and scope of the present invention.

Accordingly, the scope of the invention should be determined not by the embodiments illustrated, but by the appended claims and their legal equivalents.

What is claimed is:

1. A solar panel protection and control system comprising:
   a measurement block to measure the parameters of a solar panel;
   a protection switch to connect or disconnect said solar panel to other solar panels, the measurement block positioned in series between the solar panel and the protection switch to enable the measurement block to measure the parameters of the solar panel even when the protection switch has disconnected the solar panel;
   a bypass block to bypass said solar panel when said protection switch is disconnected;
   a test block to measure the maximum power point of said solar panel using the Maximum Power Law, the test block configured to calculate the gradient of the voltage-current curve of the solar panel;
   a communication block to communicate with an external control unit; and
   a control block to control said measurement block, said protection switch, said test block, and said communication block, whereby said solar panel can be bypassed under predetermined situations or under command of said external control unit, the control block positioned in series between the solar panel and the protection switch to enable the control block to receive power from the solar panel even when the protection switch has disconnected the solar panel.

2. The solar panel protection and control system of claim 1 wherein:
   said measurement block measures the temperature, voltage, current, or any combination of thereof of said solar panel, and said test block measures the maximum power point of said solar panel.

3. The solar panel protection and control system of claim 1 wherein:
   said bypass block is a Schottky diode.

4. The solar panel protection and control system of claim 1 wherein:
   said measurement block, said protection switch, said bypass block, said test block, said communication block and said control block are put inside the J-Box of said solar panel.

5. The solar panel protection and control system of claim 1 wherein:
   said protection switch is a relay, a NMOS, a PMOS, a PNP BJT, a NPN BJT, a IGBT, a SCR, or any combination of thereof.

6. The solar panel protection and control system of claim 1 wherein:
   said control block controls said protection switch to bypass said solar panel when at least one parameter of said solar panel measured by said measurement block equals a predetermined value, or when said control block is powered on for the first time, or when a turning-on command is not received for longer than a predetermined period of time during operation.

7. The solar panel protection and control system of claim 1 wherein:
   said communication block has its unique address and communicates with said external control unite using DC power line communication, Wifi, Bluetooth or Zigbee communication method.

8. The solar panel protection and control system of claim 1 wherein:
   said external control unit is a smart phone.

9. The solar panel protection and control system of claim 1 wherein:
   said measurement block further comprises an arc fault detection block to detect an arc fault event by directly measuring the voltage of said solar panel, and checking if the voltage shows a predetermined arc fault signature.

10. The solar panel protection and control system of claim 1 wherein:
    said external control unit monitors the operation of said solar panel by communicating with said communication block to get the parameters including but not limited to the voltage, current, temperature, arc fault and maximum power point of said solar panel.

11. The solar panel protection and control system of claim 1 wherein:
    said external control unit can send command to said communication block to bypass said solar panel in predetermined situations including but not limited to fire, arc fault, overheating, shading, damage, installation or maintenance, and can send a turning-on command to turn on said solar panel.

12. The solar panel protection and control system of claim 1 wherein:
    said test block measures the maximum power point of said solar panel in a predetermined low duty cycle to decrease the average heat dissipation of said test block.

13. The solar panel protection and control system of claim 1 wherein:
    said external control unit monitors the maximum power point of each solar panel, determines the configuration with best maximum power point of a solar panel array composed by said solar panel, and configures said solar panel array accordingly by sending command to said communication block to bypass said underperforming solar panel, whereby said solar panel array nominally works at its best maximum power point.

14. The solar panel protection and control system of claim 13 wherein:
    said external control unit monitors the maximum power point of each solar panel by commanding each of said test block to measure the maximum power point of its corresponding said solar panel at the same time, or in a sequence.

15. A solar panel protection and control system comprising:
    a measurement block to measure the parameters of a solar panel;
    a protection switch to connect or disconnect said solar panel to other solar panels, the measurement block positioned in series between the solar panel and the protection switch to enable the measurement block to measure the parameters of the solar panel even when the protection switch has disconnected the solar panel;
    a bypass block to bypass said solar panel when said protection switch is disconnected;
    a communication block to communicate with an external control unit; and
    a control block to control said measurement block, said protection switch and said communication block, whereby said solar panel can be bypassed under predetermined situations or under command of said external control unit, the control block positioned in series between the solar panel and the protection switch to enable the control block to receive power from the solar panel even when the protection switch has disconnected the solar panel.

16. The solar panel protection and control system of claim 15 wherein:

said external control unit monitors the operation of said solar panel by communicating with said communication block to get the parameters including but not limited to the voltage, current, temperature, arc fault of said solar panel.

17. The solar panel protection and control system of claim 15 wherein:

said external control unit can send command to said communication block to bypass said solar panel in predetermined situations including but not limited to fire, arc fault, overheating, shading, damage, installation or maintenance, and can send a turning-on command to turn on said solar panel.

18. The solar panel protection and control system of claim 15 wherein:

said control block controls said protection switch to bypass said solar panel when at least one parameter of said solar panel measured by said measurement block equals a predetermined value.

19. The solar panel protection and control system of claim 15 wherein:

said external control unit monitors the voltage of each of said solar panel, sends command to said communication block to bypass its corresponding underperforming solar panel whose voltage is less than that of other said solar panel by more than a predetermined value, whereby a solar panel array composed by said solar panel can work at its best maximum power point.

20. A method to measure the maximum power point of a solar panel using the Maximum Power Law, the method comprising:

(a) decreasing the voltage of said solar panel by a predetermined value;

(b) measuring the voltage and current of said solar panel, and calculating the gradient of the voltage-current curve of said solar panel, the measuring being performed even when a protection switch has disconnected the solar panel;

(c) going back to step (a) if the measured gradient is less than the negative ratio of the current to voltage of said solar panel, otherwise going to step (d); and (d) finishing the measurement, whereby said solar panel can output maximum power when working at the last measured voltage and current.

21. A method to achieve the maximum power point of a solar panel array formed by at least one solar panel, the method comprising:

(a) measuring the maximum power point of each of said solar panel using the Maximum Power Law, the measuring being performed even when a protection switch has disconnected the solar panel;

(b) calculating the total output power of said solar panel array for every possible configuration of said solar panel array;

(c) configuring said solar panel array to the configuration with the maximum output power; and (d) repeating from step (a), whereby said solar panel array can work at the maximum power point.

* * * * *